(12) United States Patent
Fritsch et al.

(10) Patent No.: US 10,362,858 B2
(45) Date of Patent: Jul. 30, 2019

(54) METHOD OF MANUFACTURING A BRUSH AND BRUSH

(71) Applicant: Braun GmbH, Kronberg (DE)

(72) Inventors: Thomas Fritsch, Eppstein (DE); Ulrich Störkel, Friedberg (DE)

(73) Assignee: BRAUN GMBH, Kronberg (DE)

( * ) Notice: Subject to any disclaimer, the term of this patent is extended or adjusted under 35 U.S.C. 154(b) by 200 days.

(21) Appl. No.: 15/246,487

(22) Filed: Aug. 24, 2016

(65) Prior Publication Data

US 2017/0065071 A1 Mar. 9, 2017

(30) Foreign Application Priority Data

Sep. 3, 2015 (EP) .................................... 15183779

(51) Int. Cl.
- *A46B 9/04* (2006.01)
- *A46D 1/00* (2006.01)
- *A46B 5/00* (2006.01)
- *A46D 3/00* (2006.01)

(Continued)

(52) U.S. Cl.
CPC .............. *A46B 9/04* (2013.01); *A46B 5/0095* (2013.01); *A46D 1/0207* (2013.01); *A46D 1/04* (2013.01); *A46D 3/00* (2013.01); *A46D 3/005* (2013.01); *A46B 2200/1066* (2013.01); *A46D 3/045* (2013.01)

(58) Field of Classification Search
CPC . A46B 9/04; A46B 2200/1066; A46B 5/0095; A46D 1/04; A46D 3/00; A46D 3/3005; A46D 3/045; A46D 1/0207
See application file for complete search history.

(56) References Cited

U.S. PATENT DOCUMENTS

| 3,408,112 A | 10/1968 | Piotrowski |
| 4,635,313 A | 1/1987 | Fassler et al. |

(Continued)

FOREIGN PATENT DOCUMENTS

| DE | 845933 | 6/1953 |
| DE | 3823203 | 1/1990 |

(Continued)

OTHER PUBLICATIONS

International Search Report with Written opinion, dated Dec. 22, 2017, 10 pages.

*Primary Examiner* — Dung Van Nguyen
(74) *Attorney, Agent, or Firm* — Vladimir Vitenberg (57) ABSTRACT

A method of manufacturing a toothbrush includes steps of providing a carrier having at least a first through hole extending from a front side to a backside of the carrier and at least a first wall element integral with the carrier and extending from the back side in a vicinity of the through hole; introducing a first cleaning element into the first through hole such that an end portion of the first cleaning element is exposed on the backside of the carrier; treating the end portion of the first cleaning element such that it deforms and becomes wider than the first through hole; and deforming the first wall element until it at least partially extends over the deformed end portion of the first cleaning element such that the first cleaning element is effectively retained in its axial position. A brush having structural features resulting from the manufacturing method.

12 Claims, 3 Drawing Sheets

(51) Int. Cl.
*A46D 1/04* (2006.01)
*A46D 3/04* (2006.01)

(56) References Cited

U.S. PATENT DOCUMENTS

| | | | |
|---|---|---|---|
| 4,637,660 A * | 1/1987 | Weihrauch | A46B 3/06 |
| | | | 264/243 |
| 4,749,233 A | 6/1988 | Weihrauch | |
| 4,892,698 A | 1/1990 | Weihrauch | |
| 5,045,267 A | 9/1991 | Weihrauch | |
| 5,458,400 A * | 10/1995 | Meyer | A46D 3/005 |
| | | | 264/243 |
| 5,609,890 A * | 3/1997 | Boucherie | A46D 3/005 |
| | | | 264/243 |
| 5,622,411 A * | 4/1997 | Weihrauch | A46B 3/04 |
| | | | 264/243 |
| 5,823,633 A | 10/1998 | Weihrauch | |
| 6,402,494 B1 | 6/2002 | Lanvers | |
| 6,406,099 B2 | 6/2002 | Boucherie | |
| 6,582,028 B2 | 6/2003 | Buchholz | |
| 6,641,764 B2 | 11/2003 | Lanvers | |
| 6,665,901 B2 | 12/2003 | Driesen et al. | |
| 6,695,414 B2 | 2/2004 | Meyer et al. | |
| 6,779,851 B2 | 8/2004 | Bouchiere | |
| 6,786,558 B2 | 9/2004 | Driesen et al. | |
| 6,832,819 B1 | 12/2004 | Weihrauch | |
| 6,957,468 B2 | 10/2005 | Driesen et al. | |
| 6,988,777 B2 | 1/2006 | Pfenniger et al. | |
| 7,162,767 B2 | 1/2007 | Pfenniger et al. | |
| 7,549,187 B2 | 6/2009 | Pfenniger et al. | |
| 7,774,891 B2 | 8/2010 | Pfenniger et al. | |
| 7,992,247 B2 | 8/2011 | Pfenniger et al. | |
| 8,418,306 B2 | 4/2013 | Pfenniger et al. | |
| 8,613,123 B2 | 12/2013 | Pfenniger et al. | |
| 9,232,852 B2 | 1/2016 | Pfenniger et al. | |
| 2001/0013152 A1 | 8/2001 | Meyer et al. | |
| 2001/0023516 A1 | 9/2001 | Driesen et al. | |
| 2001/0024060 A1 | 9/2001 | Boucherie | |
| 2001/0038237 A1 * | 11/2001 | Boucherie | A46B 3/06 |
| | | | 300/8 |
| 2001/0050507 A1 | 12/2001 | Boucherie | |
| 2002/0056941 A1 | 5/2002 | Buchholz | |
| 2002/0166188 A1 | 11/2002 | Driesen et al. | |
| 2002/0182282 A1 | 12/2002 | Lanvers | |
| 2004/0117934 A1 | 6/2004 | Pfenniger et al. | |
| 2004/0130203 A1 | 7/2004 | Driesen et al. | |
| 2006/0080795 A1 | 4/2006 | Pfenniger et al. | |
| 2007/0094824 A1 | 5/2007 | Pfenniger et al. | |
| 2009/0193604 A1 | 8/2009 | Pfenniger et al. | |
| 2011/0010881 A1 | 1/2011 | Pfenniger et al. | |
| 2011/0258797 A1 | 10/2011 | Pfenniger et al. | |
| 2013/0180069 A1 | 7/2013 | Pfenniger et al. | |
| 2014/0075696 A1 | 3/2014 | Pfenniger et al. | |
| 2016/0088925 A1 | 3/2016 | Pfenniger et al. | |

FOREIGN PATENT DOCUMENTS

| | | |
|---|---|---|
| DE | 19513451 | 10/1996 |
| DE | 19738256 A1 * | 3/1999 |
| DE | 29821121 | 4/1999 |
| EP | 0405204 | 1/1991 |

* cited by examiner

METHOD OF MANUFACTURING A BRUSH AND BRUSH

FIELD OF THE INVENTION

The present invention is concerned with a method of manufacturing a brush, in particular a toothbrush, and it is concerned with a brush that having the structural features resulting from the proposed manufacturing method.

BACKGROUND OF THE INVENTION

It is known that brushes, whether toothbrushes or other types of brushes, comprise bristles (filaments) for performing a brushing operation, where often the bristles are combined into tufts of bristles. Two distinct ways of securing a tuft of bristles at a carrier are known: A first technique includes securing a bristle or a tuft of bristles to a carrier by means of an anchor wire that holds the bristle or tuft at the carrier. In this anchor tufting technique, the cut filaments are folded at about half their length and the anchor placed in the fold is driven into a hole and the surrounding material of a carrier, thereby securing then folded filaments in the hole. In a second technique, bristles or tufts of bristles are connected to a carrier by first fusing (melting) the ends of the bristles or tufts of bristles and thereby connecting them with a hole plate through which the fused ends of the bristles extend or, in a second step, molding a carrier around the fused ends and thereby forming a positive fit between carrier and fused ends (often referred to as anchor free technology (AFT), hot tufting etc.). Beside bristles or tufts of bristles, a brush, in particular a toothbrush may comprise one or more further elements such as one or more elastomeric elements, which provide a softer brushing experience (e.g. a massaging experience). Together, these elements are called cleaning elements.

It is an object of the present disclosure to provide a manufacturing method that does not require an anchor wire in order to secure a cleaning element to a carrier, in particular where the method is an alternative to the known anchor-free techniques.

SUMMARY OF THE INVENTION

In accordance with one aspect there is provided a method of manufacturing a brush, in particular a toothbrush, comprising the steps of (a) providing a carrier having at least a first through hole extending from a front side to a backside of the carrier and at least a first wall element being integral with the carrier and extending from the back side in vicinity of the through hole, (b) introducing a first cleaning element into the first through hole such that an end portion of the first cleaning element is exposed on the backside of the carrier, (c) treating the end portion of the first cleaning element such that it deforms and becomes wider than the first through hole, and (d) deforming the first wall element until it at least partially extends over the deformed end portion of the first cleaning element such that the first cleaning element is effectively retained in its axial position.

In accordance with one aspect there is provided a brush, in particular a toothbrush, comprising a carrier having at least a first through hole extending from a front side to a backside of the carrier and at least a deformed first wall element being integral with the carrier and extending from the back side in vicinity of the first through hole, a first cleaning element extending through the first through hole and having a deformed end portion that is wider than the first through hole, the deformed end portion being disposed on the backside of the carrier, and wherein the deformed first wall element at least partially extends over the deformed end portion of the first cleaning element such that the first cleaning element is effectively retained in its axial position.

BRIEF DESCRIPTION OF THE DRAWINGS

The present disclosure will be further elucidated by a description of example embodiments and with reference to figures. In the figures

DETAILED DESCRIPTION OF THE INVENTION

In accordance with the present disclosure, a method of mounting at least a first cleaning element of a brush to a carrier in an anchor free manner is presented. Several methods of anchor-free tufting are known under names such as AFT (anchor-free tufting) or hot-tufting. Within the framework of the present manufacturing method, a first cleaning element is provided in a first through hole of a carrier and an end portion of the first cleaning element is selectively treated, in particular heated such the end portion deforms and becomes wider than the first through hole such that the first cleaning element cannot be easily pulled free from the carrier. "Wider" thus means that the deformed end portion has a shape that at least partially extends beyond the cross-section of the first through hole so that it is effectively inhibited that the first cleaning element can be easily pulled through the first through hole without applying an excessive force usually not occurring in a brushing operation or without destroying either the first cleaning element or the carrier.

Further, a first wall element being integral with the carrier is deformed so that the deformed first wall element at least partially extends over the deformed end portion of the first cleaning element such that the first cleaning element is essentially retained in its axial position in the first through hole. The first wall element extends from a backside of the carrier in vicinity of the first through hole. The term "vicinity" shall here mean that the first wall element either prolongs the first through hole (i.e. is arranged without any distance to the first through hole) or is arranged close to the first through hole such that it can be effectively deformed to at least partially extend over the deformed end portion of the first cleaning element. The distance may be in the range of between 0.0 mm and 5.0 mm, in particular in the range of between 0.0 mm and 2.0 mm, and further in particular in the range of between 0.0 mm and 1.0 mm.

By the two measures of widening the end portion and of bending the first wall element around the end portion, the first cleaning element is secured at the carrier and can only be removed by applying an excessive force that typically destroys the cleaning element or the carrier.

A brush in accordance with the present disclosure may just have a first cleaning element that is mounted in a first through hole of the carrier and is retained in its position by a deformed first wall element being integral with carrier. This shall not exclude that two, three or any arbitrary number of cleaning elements is provided in a respective equal number of through holes. The number of wall elements may be equal to the number of cleaning elements and each wall element may thus be assigned to one cleaning element in a one-to-one correspondence. This shall not exclude that instead e.g. a single wall element encloses the deformed end portions of two, three or any arbitrary number of cleaning element or that two, three or any arbitrary number of wall elements each at least partially extend over the deformed end portion of a single cleaning element. It shall also not be excluded that other elements, in particular other cleaning elements, are present on the brush that are mounted by a method different to the here proposed method.

A cleaning element, whether a first cleaning element or any further cleaning element, may be realized as a tuft of filaments (which filaments may be DuPont™ Tynex® filaments from DuPont, Wilmington, USA) or as a single-piece cleaning element made in particular at its end portion from a thermoplastic material, in particular where at least a front portion of the single-piece cleaning element is made from an elastomeric material (in some embodiments, the whole single-piece cleaning element is made from a thermoplastic elastomer and in other embodiments the single-piece cleaning element is a 2-component or multi-component element). Without limitation, a tuft of filaments may comprise between 5 to 500 filaments, in particular between 20 and 200 filaments. A single filament may have a diameter in a range of between 50 micrometer and 250 micrometer, in particular in a range of between 100 micrometer and 200 micrometer. Typical materials for monofilaments include, but are not limited to polyamide (nylon), such as PA 6.12, PBT (polybutylene terephthalate), and PET (polyethylene terephthalate). The filaments shall not be limited to monofilaments and co-extruded filaments or other multi-component filaments (e.g. coated filaments) are considered as well. E.g. filaments may be coated with a thermoplastic elastomer (TPE) material.

The step of treating the end portion of the first cleaning element may include mechanical treatment and/or chemical treatment and/or electric treatment and/or thermal treatment. It is generally known to treat the end portion of a cleaning element by selective application of heat (e.g. applying a stream of hot air or applying electromagnetic radiation such as laser light or contact heat) such that the material of the cleaning element melts and forms a blob of molten material, which blob, in particular due to e.g. gravitational forces, deforms and becomes wider than a hole (through hole or blind hole) in which the cleaning element is provided. In some techniques, plastic material forming a carrier may then be injection-molded around the solidified blob to secure the cleaning element against easy pull-out in the carrier. In the present manufacturing method, the carrier material in particular at the backside of the carrier around the first tuft hole and the material of the first cleaning element may be chosen such that the two materials form a material bond under the application of heat. Such material combinations may include, but are not limited to: PA with PA or PBT with PBT (generally, using identical materials lead to affine material pairs), or TPE-PP and PP (polypropylene), i.e. a hard plastic material and a thermoplastic elastomer blended with the same plastic material forming the hard plastic. Materials used for the carrier may include, but are not limited to: POM (polyoxymethylene), PP, PA, and PBT. In embodiments, in which two or more cleaning elements are present, the end portions of at least two of the cleaning elements are connected with each other in the step of treating the end portions of the cleaning elements. The connection may be a mechanical connection but may in particular be established by a material bond leading to an integral deformed end portion of two or more cleaning elements, further in particular wherein the molten end portions of at least two cleaning elements flow together and essentially unite to form a single-piece (i.e. integral as well) deformed end portion.

In accordance with the present disclosure, the first wall element is deformed until it at least partially extends over the deformed end portion of the first cleaning element, wherein the step of deforming the first wall element may comprise at least either mechanically treating the first wall element or thermally treating the first wall element, optionally wherein the step of deforming the first wall element comprises a combination of mechanically treating and thermally treating the first wall element. Mechanical treatment may be stamping or embossing (e.g. deforming the first wall element by use of a respectively formed stamping/embossing tool) and thermal treatment may be heating (e.g. applying a stream of hot air or applying electromagnetic radiation such as laser light or contact heat)—which may be applied until the first wall element is molten and extends at least partially over the deformed end portion of the first cleaning element. A combination of mechanical and thermal treatment may be hot embossing, where heat is transferred to the first wall element by an embossing tool such that also a brittle thermoplastic material can be deformed without breaking.

Figures 1, 2A:
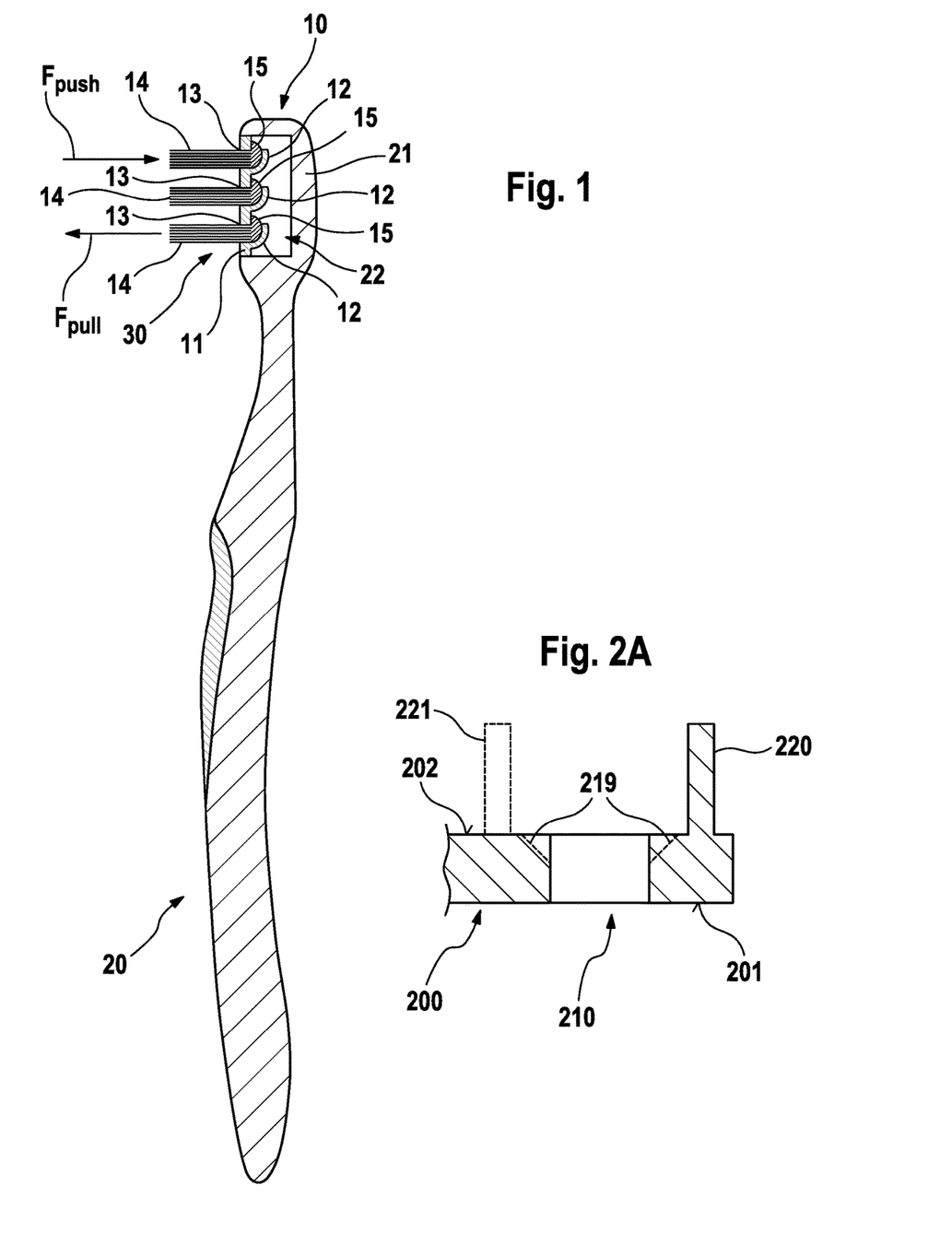
FIG. 1 is longitudinal cut through a schematically shown brush in accordance with the present disclosure.
FIG. 2A is a cut through a detail of a carrier having a first through hole and a first wall element being integral with the carrier, representing a first step in a brush manufacturing method.

FIG. 1 is a longitudinal cut through an example brush 1 that may be used as a toothbrush, in accordance with the present disclosure. The brush 1 comprises a head portion 10 and a handle portion 20. In the shown embodiment, the head portion 10 comprises a brush portion 30 and a shell-like support structure 21 that is here integral with the handle portion 20, where the shell-like support structure 21 forms a receptacle 22 in which the brush portion 30 is mounted. The handle portion 20 may be made together with the shell-like support structure in a single plastic injection molding process, even though this shall not be considered as limiting and the handle portion 20 and the shell-like support structure 21 may be made in any other technology and may in particular be separate parts that are then connected with each other. Generally, the brush 1 may comprise a head portion that is detachably attached to a handle portion. In some embodiments, the head portion comprises a brush portion that is arranged to be moveable with respect to a body of the head portion.

In the shown embodiment, the brush portion 30 comprises a carrier 11 that comprises a plurality of through holes 13, even though generally there may be just a first through hole. In each of the through holes 13, a cleaning element 14 is disposed such that respective front portions of the first cleaning elements 14 are exposed on a front side of the carrier 11 so that they are suitable for a brushing operation such as cleaning of a surface. In alignment with the previous statement, there generally may be just a first cleaning element that is arranged in the first through hole. Deformed end portions 15 of each of the cleaning elements 14 (or generally of at least the first cleaning element) are disposed at a backside of the carrier 11. As the deformed end portions 15 of the cleaning elements 14 are each wider in their geometric dimensions than the respective through hole 13 in which the cleaning element 14 is arranged, it is effectively avoided that any of the cleaning elements 14 can be easily extracted from the brush portion 30 when an external force pulls at one of the cleaning element 13 in an axial direction towards the front side of the carrier 11 as indicated by arrow $F_{pull}$. Further, each of the deformed end portions 15 of the cleaning elements 14 (or: at least the deformed end portion of the first cleaning element) is at least partially enclosed by at least one deformed wall element 12. In the shown embodiment, each deformed end portion 15 is partially enclosed by one deformed wall element 12, which shall not exclude that two or even more deformed wall elements enclose the deformed end portion of a cleaning element or that one deformed wall element may at least partially enclose two or even more deformed end portions of respectively two or even more cleaning elements as will be discussed in connection with FIGS. 3 and 4. The deformed wall elements 12 may enclose the deformed end portions 15 in a positive fit manner, even though it is not necessary that there is a perfect positive fit. It is sufficient that the deformed wall element 12 is arranged in a manner that it effectively retains the cleaning element 14 in its axial position when a force pushes against the cleaning element in axial direction towards the backside of the carrier 11 as is indicated by arrow $F_{push}$. In some embodiments, a small gap may still be present between the deformed end portion of a cleaning element and the respective deformed wall element potentially allowing a small axial movement of the cleaning element. In some embodiments, at least one of the deformed wall elements has resilient properties.

Figure 2B:
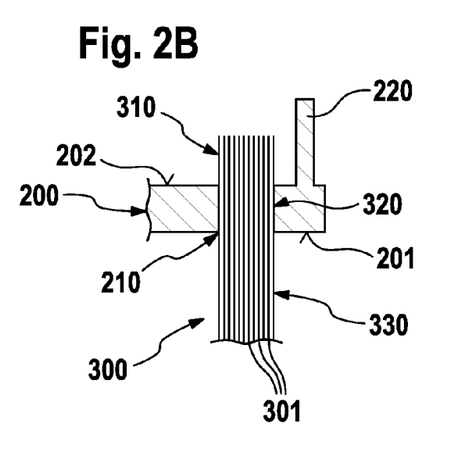
FIG. 2B is the same cut as shown in FIG. 2A, but where a first cleaning element is extending through the first through hole, representing a second step in the brush manufacturing step.
Figure 2C:
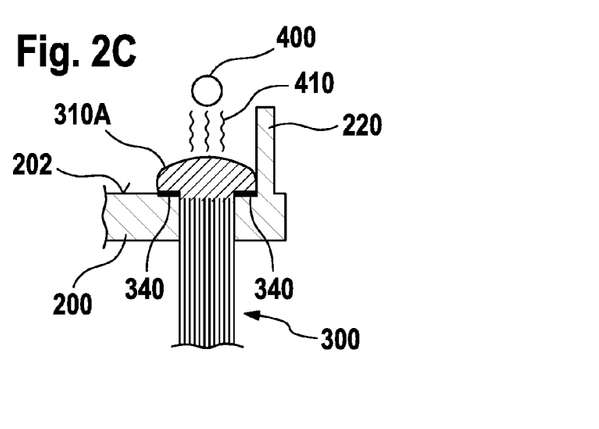
FIG. 2C is the same cut as shown in FIG. 2C, but where an end portion of the first cleaning element was treated such it deformed and became wider than the first through hole, representing a third step in the brush manufacturing step.
Figure 2D:
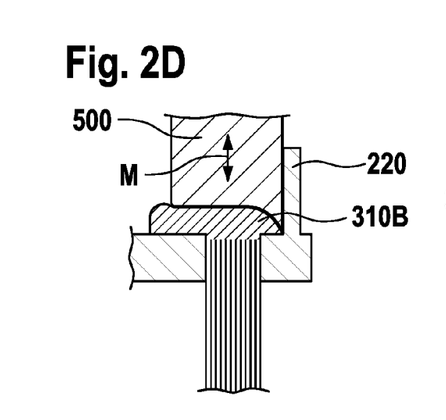
FIG. 2D is the same cut as shown in FIG. 2C, indicating a manufacturing step of mechanically treating the deformed end portion so that it takes an intended shape, representing an optional step in the brush manufacturing step.

FIGS. 2A to 2E show various stages of the herein described manufacturing method of a brush portion 30A of a brush, where in particular FIG. 2D shows an optional manufacturing step. FIGS. 2A to 2E show only a detail of the brush portion 30A. FIG. 2F shows the final manufacturing stage of the brush portion 30A and various geometric parameters are indicated. Same features of the brush portion 30A shown in the FIGS. 2A-2F are indicated by the same reference numerals.

FIG. 2A relates to a first step in the example manufacturing method of a brush as described in the following. A carrier 200 is provided, which carrier 200 has at least a first through hole 210 that extends from a front side 201 of the carrier 200 to a backside 202 of the carrier 200. The front side 201 is the side of the carrier 200 that is intended to be facing the treatment location of the final brush, where the backside 202 is then essentially opposite to the front side 201. While the first through hole 210 is shown as being perpendicular to the plane of extension of the carrier 200, this shall not be considered as limiting. The carrier 200 itself may have any arbitrary form that may be considered by a skilled person and the first through hole may in particular extend at an angle with respect to the tangent plane at the location of the first through hole on the front side of the carrier (which may result in a cleaning element that extends at an angle with respect to a normal on the tangent plane at the location of the first through hole on the front side of the carrier). In some embodiments, the first through hole comprises a chamfered end portion 219 (shown in dashed lines) such that the first through hole widens towards the backside 202 of the carrier. A chamfered portion 219 may ease the insertion of a first cleaning element into the first through hole. Alternatively or in addition, the chamfered portion 219 is located on the front side 201 of the carrier 200.

A first wall element 220 being integral with the carrier 200 extends from the backside 202 of the carrier, where the extension direction of the first wall element 220 is essentially perpendicular to a tangent plane at the location of the first through hole 210 on the backside 202 of the carrier 200. As shown in dashed lines, an optional further wall element 221 being integral with the carrier 200 may extend as well from the backside 202 of the carrier 200.

FIG. 2B relates to a second step in the example manufacturing method of a brush as described. A first cleaning element 300 has been introduced into the first cleaning hole 210 such that an end portion 310 of the first cleaning element 300 is exposed on the backside 202 of the carrier 200. The height of the end portion 310 above the backside 202 of the carrier 200 may depend on the amount of material of the end portion that shall be treated to form a deformed end portion 310A of the first cleaning element 300 (see FIG. 2C). A mounting portion 320 of the first cleaning element 300 extends through the first through hole 210 and a front portion 330 of the first cleaning element 300 is exposed on the front side 201 of the carrier 200. The length of the front portion 330 of the first cleaning element 300 being exposed on the front side 201 of the carrier 200 depends on mechanical properties that the front portion 330 shall have when a treatment surface is brushed and the length may generally range in between 1.0 mm to 100.0 mm, in particular in between 3.0 mm and 20.0 mm for toothbrushes, further in particular in between 5.0 mm and 12.0 mm. While the first cleaning element 300 is here depicted as being a tuft of filaments 301, this shall not be interpreted as limiting and the first cleaning element may also be realized by a single-piece element, e.g. a cleaning element made from a thermoplastic elastomer. FIG. 2C relates to a third step in the example manufacturing method of a brush as described. A treatment unit 400 is used to treat the end portion 310 of the first cleaning element 300 such that the end portion deforms and thereby becomes wider in its geometric extensions than the first through hole 210. In the shown example, the treatment unit 400 is a heating unit that applies electromagnetic radiation 410 to the end portion 310 such that the material of the end portion 310 melts and forms a deformed end portion 310A that is wider than the first through hole 210. The thermal radiation 410 may be light (e.g. laser light) that is absorbed by the end portion 310 such that the material of the end portion 310 heats or the thermal radiation may be another type of electromagnetic radiation that is absorbed by the end portion 310. Obviously, any other treatment unit 400 can be used as well. If the first cleaning element 300 is a tuft of filaments made from a thermoplastic material, the individual filaments 301 melt together and form a blob of molten material. The heat and/or light may be selectively applied to the end portion 310 of the first cleaning element so that the carrier 200 itself is essentially not directly heated, even though the carrier material on the back side 202 of the carrier 200 around the first through hole 210 may eventually heat and start to melt as well, in particular when it comes into contact with the heated material of the deformed end portion 310A. As has been explained before and as an optional feature, the material of the first cleaning element 300 and of the carrier 200 at least on the backside 202 around the first through hole 210 may be chosen such that the heated and at least partially molten materials form a material bond in a bonding area 340 such that the solidified deformed end portion 310A would essentially not be nondestructively detachable from the carrier 200. In some embodiments, the treatment unit 400 may be a mechanical treatment unit or treatment unit that combines application of heat and mechanical deformation (e.g. hot embossing).

The typical retention force achieved by the described technology lies in a range of between about 15 N and about 25 N.

FIG. 2D relates to an optional step in the example manufacturing method of a brush as described. A stamping or embossing tool 500 may be used to further deform the molten deformed end portion 310A while it is in a state in which it can be further deformed. The stamping or embossing tool 500 may in particular be moved onto and away from the deformed end portion 310B along an axial direction as indicated by double arrow M. Treating the end portion 310 of the first cleaning element 300 with thermal radiation or heat such that it melts and deforms results in a structure of the molten deformed end portion that depends on factors such as gravitational forces and surface tension. A succeeding stamping or embossing step may bring the deformed end portion 310A into an intended shape that may, e.g., be optimized for bending the first wall element 220 over the final deformed end portion 310B. It is noted that in the following, the deformed end portion will be referenced by 310B, while it should be understood that that the stamping or embossing step is optional and the deformed end portion 310B may have resulted from a general step of treating the end portion 310 described with reference to FIG. 2C. In some embodiments, the end portion 310 is treated by a hot stamping or embossing tool, thus combining the steps of heating and mechanically deforming the end portion 310. Insofar, the manufacturing step of FIG. 2D may be comprised in the treatment under the manufacturing step described with reference to FIG. 2C.

Figure 2E:
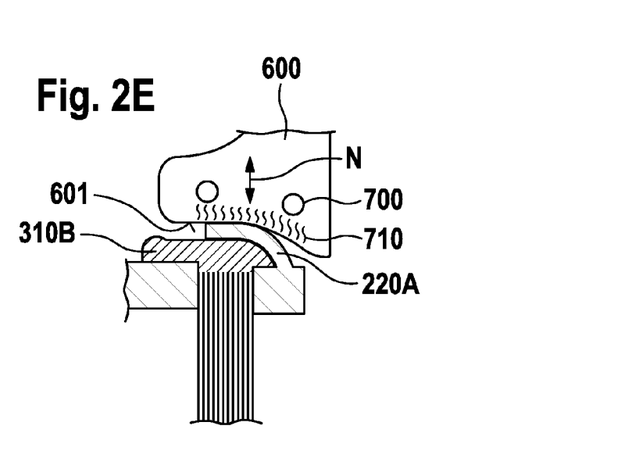
FIG. 2E is the same cut as shown in FIG. 2D, where the first wall element was treated in such a manner that it deformed and resultantly extends at least partially over the deformed end portion, representing a fourth step in the brush manufacturing step.
Figure 2F:
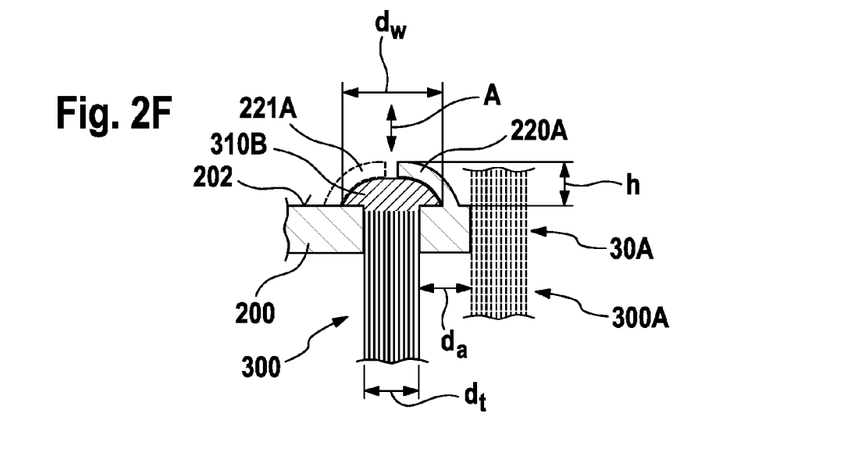
FIG. 2F is the same cut as shown in FIG. 2E, showing the final stage of the mounted cleaning element, in which some geometrical dimensions are indicated.

FIG. 2E relates to a fourth step in the example manufacturing method of a brush as described. In this manufacturing step, the first wall element 220 is deformed so that it at least partially extends at least over the deformed end portion 310B of the first cleaning element 300. In some embodiments, this may be achieved by axially moving a hot stamping or embossing tool 600 onto the first wall element 220. The hot stamping or embossing tool 600 may in particular have a guiding and forming surface 701 against which a free end of the first wall element 220 abuts and then glides along in a direction as defined by the curvature of the guiding and forming surface 701. The hot stamping or embossing tool 600 may comprise a heat source 700 that heats at least the hot stamping or embossing tool 600, but which may also emit thermal radiation 710 such that the first wall element 220 heats without contact with the hot stamping or embossing tool 600 and becomes easily deformable. After the hot stamping or embossing tool 600 has been axially moved to a target deformation position, it will then be moved away from the deformed first wall element 220A. The deformed first wall element 220A then cools and solidifies. In some embodiments, mechanical treatment alone is sufficient to deform the first wall element 220, depending on, inter alia, the chosen material, its dimensions and its Young's modulus. In some embodiments, treatment with heat/thermal radiation is sufficient to deform the first wall element 220. E.g. heat may be selectively applied at an area of the first wall element facing the deformed end portion so that the first wall element is weakened and bends over. In some embodiments, the first wall element may just be molten in order to extend at least partially over at least the deformed end portion 310B of the first cleaning element 300.

FIG. 2F relates to the final stage of a brush portion 30A of a brush made in accordance with the present disclosure (just a detail of the brush portion 30A is shown). As was already indicated in FIG. 2A, a further wall element 221 may have been extending in the vicinity of the first through hole 300, which further wall element 221 may have been deformed as well so that the deformed further wall element 221A as well extends partially over the deformed end portion 310B of the first cleaning element 300, as is indicated by dashed lines in FIG. 2F. Provision of two deformed wall elements 220A, 221A, in particular when arranged opposite to each other, reduces the probability that leverage forces acting on a single first wall element may eventually loosen the retaining force provided by the deformed first wall element 220A.

The deformed end portion 310B of the first cleaning element 300 has a width $d_w$ in the paper plane, which is larger than the smallest width $d_t$ of the first through hole 210 measured in paper plane. Generally and when seen in a top view, the area of the deformed end portion 310B of the first cleaning element 300 extends beyond the area of the first through hole at least along a certain angular range such as more than 90 degrees. In some embodiments, the area of the deformed end portion 310B contains the area of the first through hole 210. The mounting height h of the first cleaning element 300 (the mounting height including the thickness of the deformed end portion 310B extending beyond the surrounding backside 202 of the carrier 200 and the thickness of the deformed first wall element 220B) can be made relative low, allowing for arranging other structures in close proximity of the backside of the carrier 200. Typical mounting height h values are in the range of between 0.4 mm and 3.0 mm. The thickness of the first or further wall element may lie in a range of between 0.4 mm and 1.2 mm and its length may lie in a range of between 0.7 mm to 1.5 mm. The mounting height can, e.g., be influenced by a chamfer of the first through hole on the backside of the carrier so that the deformed end portion may at least partially be received in the chamfer volume.

A minimum width $d_a$ of the carrier on one side of the first through hole 210 may be less than 1.0 mm, in particular in the range of between 0.5 mm to 0.8 mm. This allows that another cleaning element 300A (mounted on another carrier) indicated by dashed lines may extend at the side of the carrier 200 with a very small distance to the first cleaning element so that a dense field of cleaning elements 300, 300A can be achieved. This is essentially impossible using standard anchor tufting technology, which would require a width $d_a$ of at least about 1.0 mm in order to avoid breakage of the carrier when a tuft is mounted by an anchor wire. The carrier 200 carrying the first cleaning element 300 and the other carrier carrying the other cleaning element 300A could then be arranged for relative motion.

Irrespective whether a material bond was formed between the material of the deformed end portion 310B and the backside 202 of the carrier 200 around the first through hole 210 or not, the fact that the area of the deformed end portion 310B of the first cleaning element 300 extends beyond the area of the first through hole 210 and the fact that the deformed first wall element 220A extends over the deformed end portion 310B effectively retains the first cleaning element 300 in its axial position, e.g. there is essentially no possibility to move the first cleaning element 300 in axial direction through the first through hole 210, where a potential axial movement is indicated by double arrow A. Slight axial movement of the first cleaning element may be allowed if a small gap remains between the deformed end portion of the first cleaning element and the deformed first wall element or if the deformed wall element has a certain resiliency.

Figure 3:
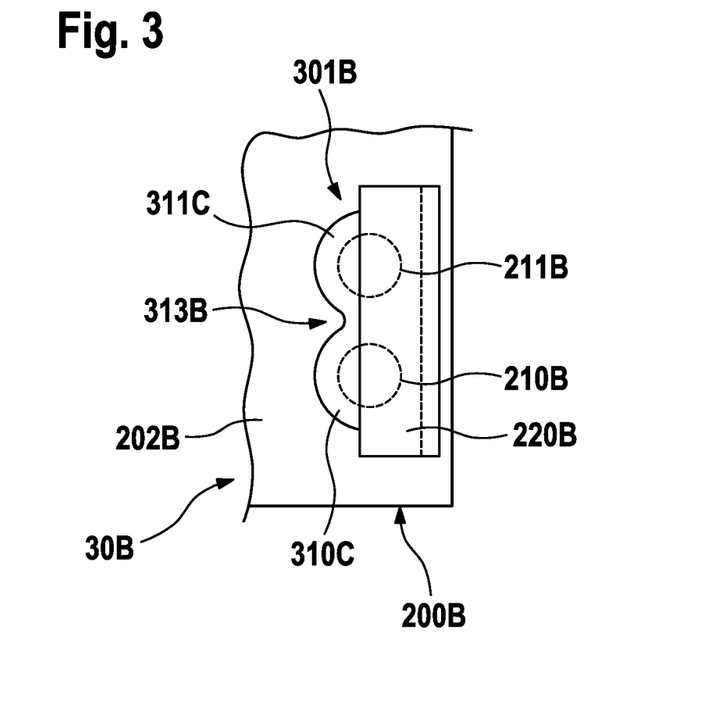
FIG. 3 is a top view onto a carrier in which a first cleaning and a further cleaning element are mounted in a first through hole and in a further through hole, respectively, and where a deformed first wall element integral with the carrier extends partially over deformed end portions of the first and further cleaning elements.

FIG. 3 is a schematic top view onto an example detail of a brush portion 30B, where the top view is onto a backside 202B of a carrier 200B on which cleaning elements are mounted. In this example embodiment, the carrier 200B has a first through hole 210B and a further through hole 211B. A first cleaning element 300B is arranged in the first through hole 210B and a further cleaning element 301B is arranged in the further through hole 211B. The first cleaning element 300B has a deformed end portion 310C and the further cleaning element 301B has a deformed end portion 311C that are connected to each other and the material of the two deformed end portion 310C, 311C has become integral in an area 313B. A deformed first wall element 220B extends partially over both deformed end portions 310C and 311C and essentially retains the first and the further cleaning element 300B, 301B in their axial positions.

Figure 4:
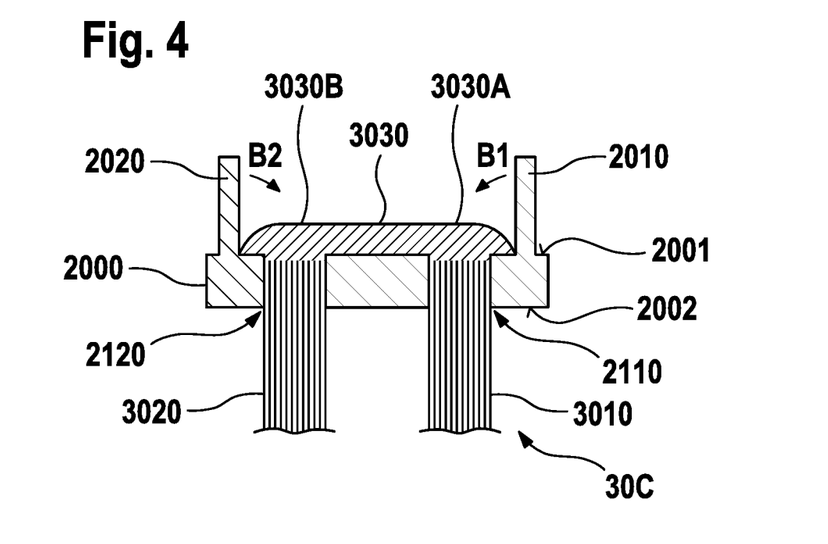
FIG. 4 is a cut through another example carrier at a manufacturing stage similar to what is shown in FIG. 2C, but where a first and a further cleaning element are being mounted and a first and a further wall element extend from the carrier.

FIG. 4 is a cut through another example embodiment of a detail of a brush portion 30C of a brush made in accordance with the manufacturing method described herein, where the brush portion 30C is in a manufacturing stage that coincides with the stage that results from the manufacturing steps described in FIGS. 2A to 2C (optionally including the step described with reference to FIG. 2D). In this example embodiment, a first cleaning element 3010 and a further cleaning element 3020 were introduced into a first through hole 2110 and a further through hole 2120, respectively, which are provided in a carrier 2000. The carrier 2000 has a front side 2001 and a backside 2002. A first wall element 2010 and a further wall element 2020 extend from the backside 2002 of the carrier 2000 in the vicinity of the first through hole 2110 and of the further through hole 2120, respectively. The end portions of the first and further cleaning element 3010, 3020 had been treated (here: heated) so that the end portions melted and connected which each other so that an integral deformed end portion 3030 was formed that comprises the deformed end portion 3030A of the first cleaning element 3010 and the deformed end portion 3030B of the further cleaning element 3020. In a next manufacturing step, the first and further side walls 2010, 2020 will be deformed (as has already been described) so that they bend over the joint deformed end portion 3030 as indicated by arrow B1 and B2.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. A method of manufacturing a toothbrush, comprising the steps of:
   providing a carrier having at least a first through hole extending from a front side to a backside of the carrier and at least a first wall element being integral with the carrier and extending from the backside in a vicinity of the first through hole;
   introducing a first cleaning element into the first through hole such that an end portion of the first cleaning element is exposed on the backside of the carrier;
   treating the end portion of the first cleaning element such that it deforms and becomes wider than the first through hole; and thereafter
   deforming the first wall element until it at least partially extends over the deformed end portion of the first cleaning element such that the first cleaning element is effectively retained in its axial position, wherein the step of deforming the first wall element is performed after the step of treating the end portion of the first cleaning element.

2. The method in accordance with claim 1, wherein in the step of providing a carrier the carrier is provided with at least a further wall element that is integral with the carrier and extends at least in the vicinity of the first through hole.

3. The method in accordance with claim 2, wherein the step of treating the end portion of the first cleaning element includes heating the end portion such that the end portion at least partially melts.

4. The method in accordance with claim 3, wherein the step of treating the end portion of the first cleaning element comprises mechanically treating the end portion of the first cleaning element while it is in a heated state.

5. The method in accordance with claim 3, wherein the material of the carrier at least at the backside around the through hole and the material of at least the end portion of the first cleaning element are chosen such that a material bond develops between them when the end portion is heated and contacts the carrier around the first through hole.

6. The method in accordance with claim 1, further comprising the steps of introducing at least a further cleaning element into a further through hole extending from the front side to the backside of the carrier such that an end portion of the further cleaning element is exposed on the backside of the carrier and of treating the end portion of the further cleaning element such that it deforms and becomes wider than the further through hole.

7. The method in accordance with claim 6, wherein the end portions of the first cleaning element and the further cleaning element become connected with each other.

8. The method in accordance with claim 6, wherein the carrier is provided with at least a further wall element that is integral with the carrier and extends from the backside of the carrier at least in the vicinity of the further through hole.

9. The method in accordance with claim 1, wherein the step of deforming the first wall element comprises at least one of mechanically treating the first wall element and thermally treating the first wall element.

10. The method in accordance with claim 1, wherein the first wall element functions as a stopper arranged to spatially confine the deformation of the end portion of the first cleaning element.

11. The method in accordance with claim 1, wherein the first cleaning element is a tuft of filaments.

12. The method in accordance with claim 1, wherein the first cleaning element is a single-piece element having an end portion made from a thermoplastic material.

\* \* \* \* \*